July 7, 1936. M. MERTA 2,046,572
FILM MOVING MECHANISM
Filed Nov. 4, 1932 2 Sheets-Sheet 2

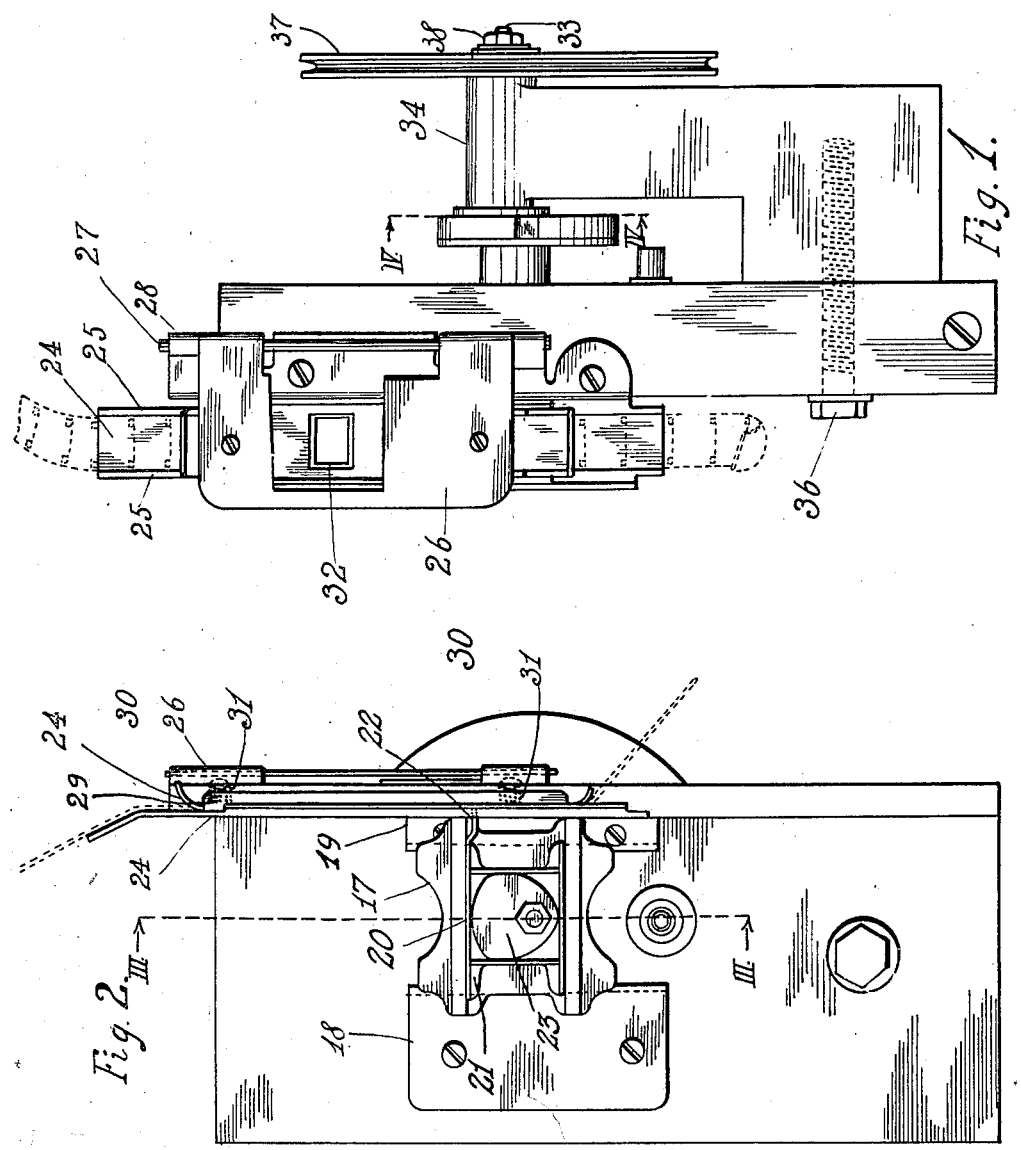

Inventor
by Method Merta
John F. Brezina
Attorney

Patented July 7, 1936

2,046,572

UNITED STATES PATENT OFFICE 2,046,572

FILM MOVING MECHANISM

Method Merta, Chicago, Ill., assignor of one-half to Lewis H. Moomaw, Wilmette, Ill.

Application November 4, 1932, Serial No. 641,145

2 Claims. (Cl. 88—18.4)

This invention relates to a mechanism for moving film through a moving picture projecting machine and particularly to the type in which gelatine or other composition film having spaced apart edge apertures is employed. Machines of known construction, either those used in moving picture theaters or those for home use, have heretofore employed either sprocket wheels having a plurality of teeth which engage the film apertures to pull the film through the film gate of the projecting machine and across the film aperture, or have employed a rotating and reciprocating hook-like claw which is driven by power means to cause said claw to engage successive apertures and draw the same downwardly. Because the film must necessarily travel at a comparatively high speed great difficulties and unsatisfactory reproduction has been experienced due to the fact that the reciprocating claw when moving in a downwardly diagonal position frequently engages the edges of the film apertures to push the film outwardly, and when the film is lowered the distance equal to that between two film apertures the claw is withdrawn in a downwardly diagonal position, again frictionally contacting the edges of the film apertures to cause the film to be drawn a very small distance rearwardly or in the direction opposite to that imparted to the film when the film moving claw enters the film apertures. This motion repeated at high speeds has resulted in vibration of the film horizontally and in many types of machines it has been impossible to eliminate it. This unsatisfactory vibration of the film causes a jerky motion in the reproduction which is difficult upon the viewer's eyes.

My invention has for its object the provision of a mechanism adapted to be attached to practically any type of known machine, which mechanism causes film engaging pins to move exactly horizontally into the film and horizontally away from the film instead of in arcuate and diagonal directions.

A further object of my invention is the provision of a mechanism in which the movable film engaging element is moved exactly horizontally and vertically in downward or upward direction, the downward vertical stroke pulling with it the apertured film without imparting vibration thereto.

A further object of my invention is the provision of a mechanical movement adapted to drive the vertically and horizontally moving film engaging member in such manner that the downward working stroke of the film moving and engaging member will be much faster than the movement of said member in any of the other three directions, at the same time the speed of the driving means being constant.

A further object of my invention is the provision of a mechanical movement whereby an object moving element which is mounted for vertical and horizontal movement will be moved faster over a desired portion of the cycle of its travel than its movement over the remaining portions.

A further object of my invention is the provision of power transmission means from a rotating element whereby a rotatable member will be rotated at varying degrees of speed during one complete rotation, the speed of the power element remaining constant.

Other and further objects of this invention will be apparent from the disclosures in the specification and the accompanying drawings.

This invention (in a preferred form) is illustrated in the drawings and hereinafter more fully described.

On the drawings:

Fig. 1 is an end elevational view of my device showing the preferred form of my mechanism in relative position to the film gate and film.

Fig. 2 is a side elevation taken from the left of Fig. 1 showing in detail the film engaging member and the means whereby the same is moved vertically and horizontally.

Figs. 5, 6, 7 and 8 respectively illustrate the respective positions of the cam when the film moving member is making one cycle.

Figure 9:
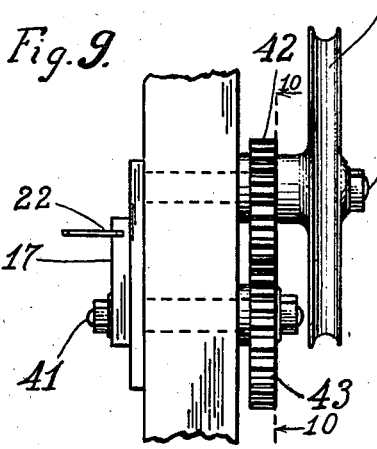

Fig. 9 is an end elevational view of a modified form of the means which I employ for transmitting the power to effect varied rotative speed of the film moving member.

Figure 10:
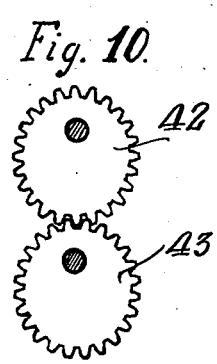

Fig. 10 is an enlarged cross sectional view taken from the left on line X—X of Fig. 9.

As shown on the drawings:

The reference numeral 10 indicates an apertured mounting block in which is mounted the bearing bushing 11, one end of which preferably projects from one side of the block. Rotatably mounted in said bearing bushing 11 is the shaft 12, the enlarged end of which has securely mounted thereon a circular plate 13, said plate being shown in Fig. 4 and in cross section in Fig. 3. The plate 13 has a diametric groove 14 and substantially semi-circular fiber segments 15 being secured on opposite sides of said groove, as clearly indicated in Figs. 4 and 3. The elongated block 16 which has an aperture in one end thereof is adapted to slide in said groove for a purpose which will be apparent hereinafter. The opposite end of the shaft 12 is reduced, as shown in cross section in Fig. 3, and passes through the central hollow portion of a frame member 17 which is preferably rectangular and made of fiber. The frame member 17 has vertical guide flanges formed integral which slidably engage one edge of a pair of spaced apart guide plates 18 and 19 respectively, said guide plates being secured by screws or the like in the relative positions shown in Fig. 2. The frame member 17 has outwardly extending flanges 20, as clearly indicated in Figs. 2 and 3, said flanges forming opposed corner recesses as indicated. A square shaped hollow frame 21, preferably made of metal and having transversely extending flanges, is slidably mounted between the flanges 20 of the frame member 17 so that the frame 21 may move horizontally within the frame 17, the opposite sides thereof slidably engaging the flanges 20. Formed integral with the upper corner of the frame 21 is a horizontally extending arm, the end of which is bifurcated to form a pair of spaced apart pins 22, said pins being adapted to engage the apertures of a film as hereinafter described.

Figure 5:
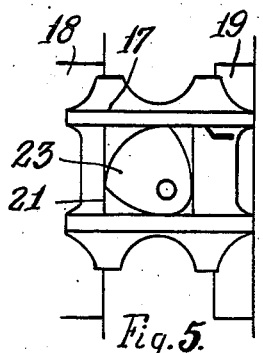
Figure 6:
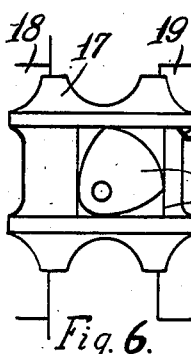
Figure 7:
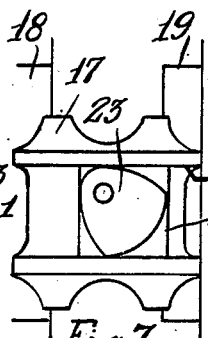
Figure 8:
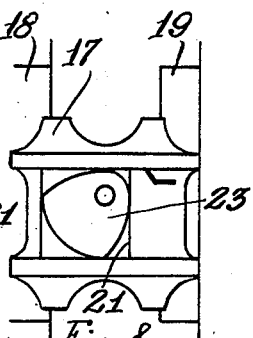

Securely mounted by means of a nut or the like on the reduced end of the shaft 12 and snugly fitting within the inner frame 21 is a substantially triangular cam 23, said cam being of a size so that it may snugly rotate within the frame 21. It will be apparent that rotation of the shaft 12 and cam 23 thereon in a clockwise direction, looking at Fig. 2, will cause the frame 21 to move horizontally to the right, as illustrated in the position of Figs. 5 and 6, that when the cam 23 reaches the position indicated in Fig. 6 it will cause the frame 23 and the frame member 17 to move downwardly into the position illustrated schematically in Fig. 7; and then upon further rotation of the cam to the position shown in Fig. 8, the frame 23 and the frame member 17 will have remained in the same position; that upon further movement from the position shown in Fig. 8 to that shown in Fig. 5 the frame member will be moved upwardly to the original position shown in Fig. 5.

Figure 3:
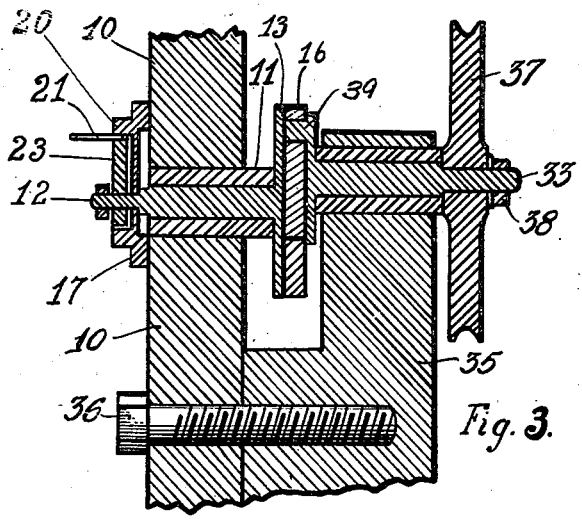
Fig. 3 is a cross sectional view taken on line III—III of Fig. 2.
Figure 4:
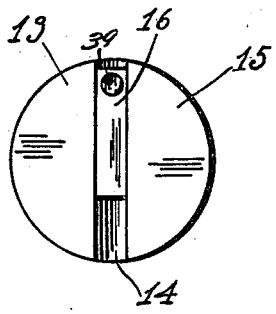
Fig. 4 is a fragmentary view taken on line IV—IV of Fig. 1.

The film gate illustrated in Figs. 2 and 3 comprises a guide plate 24 which is secured to the mounting block 10 by screws or the like in a well known manner, the guiding plate extending a short distance upwardly and downwardly and having lateral flanges 25 which serve to guide the apertured film. The upper end of the guide member 24 is preferably bent in a diagonal direction as indicated in Fig. 2 so that the film will not engage the end of said plate. A door 26 having its central portion cut away as shown in Fig. 1 is hingedly mounted upon a vertical pin 27, the ends being secured to the film gate by means of hooks 28. Secured upon the inner side of the door 26 is an elongated apertured film tension member 29 which fits between the flanges of the guide plate 24 and is yieldably mounted with respect to the door 26 by means of a pair of pins 30 and relatively small coiled springs 31 which surround said pins and separates the tension member 29 from the door 26. Below the rectangular film aperture 32 formed in the guide plate 24 are formed a pair of vertical slots (not shown). The pins 22 formed integral with the upper part of the frame 21 being adapted to project into said spaced apart slots to engage the edge apertures of the film and move the same downwardly. Upon completion of the downward path the pins move horizontally out of the apertures in the guide plate 24. This cycle is repeated in the manner previously described, the pins 22 moving horizontally and perpendicularly to the film without imparting any undesirable movement or vibration to the film, then moving the film downwardly and thereafter the pins move horizontally out of the film apertures without imparting undesirable movement to the film.

As is well known, the rate at which the film passes through the projector head must be relatively fast, ranging from one foot in 2½ seconds to one foot in 1 second, and in order that the mechanical parts of my device may draw the film at the desired speed in a downward direction I have provided a highly novel means permitting relatively slow movement of the mechanical parts of my device, at the same time moving the film at the required and desired speed. This is accomplished by my mechanism which will now be described which, when adjusted to one of several positions, will cause the film engaging pins 22 and the said frames to move in downward film-drawing direction at a speed twice as fast as their travel in any other direction.

The preferred form of this mechanism comprises the axle 33 which is journalled in a suitable bearing 34 formed in the upper end of a right angled bracket 35, said bracket being secured to mounting plate 10, for example by a threaded screw 36. The position of the axle 33 is such that it is non-concentric and in non-alignment with the axis of the shaft 12, one end of the shaft 33 terminating a short distance away from the end of the shaft 12, and its other end projecting outwardly for the convenient mounting thereon of a suitable pulley 37 which in the preferred form is secured thereon by means of a nut 38. Formed integral with the inner end of the axle shaft 33 is a horizontally extending eccentric stud 39 which normally engages and rotates in the aperture of the block 16. It will be apparent that rotation of the shaft 33 will also rotate the circular plate 13, the stud 39 rotating and forming a non-concentric circle about the axis of the shaft 12 and passing close to said axis on one side and gradually farther away from the axis in the other side. As the shaft 33 is rotated it will be apparent that the slidable block 16 will slide back and forth in diametric groove 14 and the shaft 12 will be caused to rotate with much greater speed, according to desired adjustment, when the stud is close to the axis of shaft 12, and with slower speed when it is farther away. By adjusting the relative location of the bracket 35 with respect to the axis of the shaft 12 during a single rotation thereof it may be regulated so that the downward movement of the pins 22 and inner frame will be greater than movement in any other direction, this permitting a slower and uniform rotation of the pulley 37 and shaft 33 and at the same time attaining the desired and relatively rapid downward movement of the film.

The modified form of my mechanism for attaining varied rotative speed in the film moving element heretofore described is illustrated in Figs. 9 and 10. In this form the non-concentric axles 40 and 41 are mounted in a manner similar to that described herein with reference to the preferred form of my invention, the only modification being in the use of an ovoid shaped gear wheel 42 which has an aperture relatively near its periphery and is mounted on the axle 40 as indicated in Fig. 1. A similar ovoid shaped gear wheel 43 having a non-concentric aperture near its periphery is mounted on the end of the axle 41 in such a position that the teeth of the gear wheel 43 will constantly mesh with those of the gear wheel 42. As the axle 40 is rotated it will be apparent that an irregular and varied rotative speed is obtained by the axle 41 and by placing the gear wheel in the proper position the film moving pins 22 and the frames heretofore described will be moved at a relatively greater speed upon the downward stroke than in any other direction.

It will be understood that the mechanical movement herein described which attains a varied rotative speed during each cycle with simultaneous uniform rotation from the power source may be employed in devices other than that described, and I desire that it be understood that my invention be not limited to the specific application of this mechanism herein described.

I am aware that many changes may be made and numerous details of the invention and construction thereof may be varied through a wide range without departing from the principles of this invention, and I therefore do not desire to limit the patent granted thereon otherwise than necessitated by the prior art.

I claim as my invention:

1. In a mechanism for intermittently moving a film strip in a projector head, an apertured mounting block releasably connected to the projector head; a rotatable shaft journalled in said aperture, one end of said shaft being reduced and projecting horizontally; a grooved drive pulley mounted on the projecting end of said shaft; a perpendicularly extending member formed integral with the opposite end of said drive shaft; a transversely extending integral stud adjacent the periphery of said member; an axle shaft journalled in said projector head in a position non-concentric and parallel to said first mentioned shaft, said axle shaft having one end terminating in an integral wheel; a pair of spaced apart opposed substantially semi-circular plates secured on said wheel and forming a diametrically extending groove therebetween; an apertured block slidable in said groove, said stud rotatably engaging said block aperture; a substantially triangular cam on the opposite end of said last mentioned axle shaft; and means intermittently actuable by said cam, when rotated, to impart movement to a film, the substantially uniform rotation of said groove pulley and drive shaft being adapted to rotate said axle shaft at varying speeds during each cycle.

2. In a mechanism for intermittently moving a film strip in a projector head, a driven shaft journalled in substantially horizontal position therein; a wheel formed integrally with one end of said shaft; a pair of opposed spaced apart substantially semi-circular members on the surface of said wheel and forming a diametrically extending groove; an apertured block slidable in said groove; a driving shaft journalled parallel, adjacent to and non-concentrically to said driven shaft and adjacent said wheel, one end of said driving shaft terminating in a perpendicularly extending arm; a perpendicularly extending stud on said arm in rotative engagement with the aperture of said slidable block; means for rotating said driving shaft to impart variable speed to said driven shaft; a substantially triangular cam on the other end of said driven shaft, and mechanism movable vertically and horizontally by rotation of said cam and said driven shaft adapted to engage and impart intermittent movement to a film strip engaged thereby.

METHOD MERTA.